United States Patent
Paul et al.

(10) Patent No.: US 11,558,006 B2
(45) Date of Patent: Jan. 17, 2023

(54) ROOF COVERING ELEMENT, SOLAR ROOF COVERING ELEMENT, ASSEMBLY OF SOLAR ROOF COVERING ELEMENTS, AND METHOD FOR PRODUCING A SOLAR ROOF COVERING ELEMENT

(71) Applicant: Autarq GmbH, Prenzlau (DE)

(72) Inventors: Cornelius Paul, Hamburg (DE); Dieter Neberg, Berlin (DE); Martin Mack, Prenzlau (DE)

(73) Assignee: Autarq GmbH, Prenzlau (DE)

( * ) Notice: Subject to any disclaimer, the term of this patent is extended or adjusted under 35 U.S.C. 154(b) by 32 days.

(21) Appl. No.: 17/041,478

(22) PCT Filed: Mar. 27, 2019

(86) PCT No.: PCT/DE2019/000084
§ 371 (c)(1),
(2) Date: Sep. 25, 2020

(87) PCT Pub. No.: WO2019/185076
PCT Pub. Date: Oct. 3, 2019

(65) Prior Publication Data
US 2021/0126576 A1    Apr. 29, 2021

(30) Foreign Application Priority Data
Mar. 27, 2018 (DE) .................. 10 2018 002 476.9

(51) Int. Cl.
*H02S 20/25* (2014.01)
*H02S 40/34* (2014.01)

(52) U.S. Cl.
CPC .............. *H02S 20/25* (2014.12); *H02S 40/34* (2014.12); *Y02B 10/10* (2013.01); *Y02E 10/50* (2013.01)

(58) Field of Classification Search
CPC ......... H02S 20/25; H02S 40/34; Y02B 10/10; Y02E 10/50
See application file for complete search history.

(56) References Cited

U.S. PATENT DOCUMENTS

| | | | | |
|---|---|---|---|---|
| 4,433,200 A | * | 2/1984 | Jester | ............... H01L 31/0481 136/251 |
| 2010/0105245 A1 | * | 4/2010 | Good | ............... H01R 12/7035 439/571 |

(Continued)

FOREIGN PATENT DOCUMENTS

| | | | | |
|---|---|---|---|---|
| CA | 1279127 C | * | 1/1991 | ....... H01L 27/14665 |
| DE | 197 04 255 A1 | | 8/1998 | |

(Continued)

OTHER PUBLICATIONS

International Search Report corresponding to PCT Application No. PCT/DE2019/000084, dated Jul. 30, 2019 (German and English language document) (6 pages).

*Primary Examiner* — Brian D Mattei
*Assistant Examiner* — Omar F Hijaz
(74) *Attorney, Agent, or Firm* — Maginot, Moore & Beck LLP

(57) ABSTRACT

The disclosure relates to a roof covering element, a solar roof covering element, to an assembly of solar roof covering elements, and to a method for producing a solar roof covering element. A roof covering element and a solar roof covering element are to be provided for a solar roof system, which can be produced by means of a cost-effective mass production process and which enable a simple and cost-effective roof mounting. The disclosure is characterized by a roof covering element with a flat main part, the upper face of which has a receiving surface for a solar module and which has an opening or a bore running perpendicularly to the main surface, at least two electrical lines being guided together through said opening or bore, wherein the lines end on the upper face of the main part in the region of the receiving surface as contact means, said contact means being held or guided in an axially movable manner in a common flat connection socket, the electrical lines being guided in a (Continued)

Figure 1:
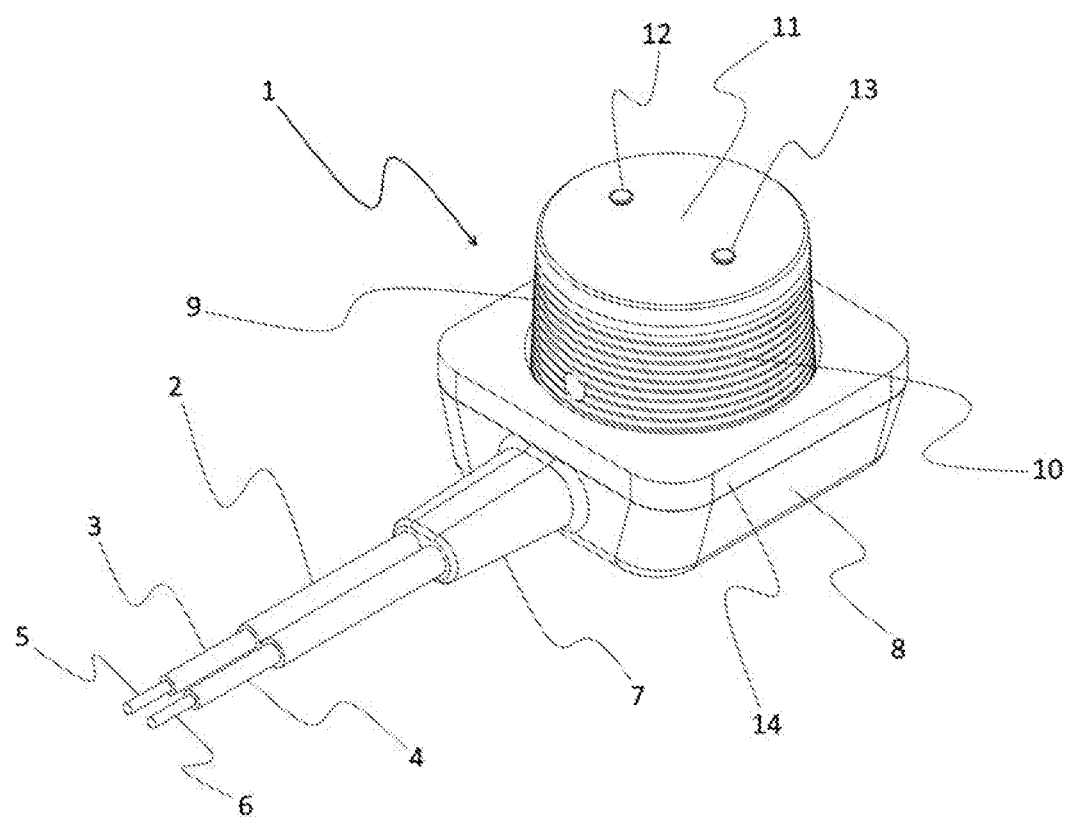

common plug-in socket from the lower face through the opening or the bore and wherein the plug-in socket on the lower face of the main part is held in the axial plug-in direction in an interlocking manner by a plug-in flange and on the upper face of the main part is held against its axial plug-in direction in an interlocking and/or force-fitting manner by a locking means and forms the connection socket on the upper face of the main part.

31 Claims, 15 Drawing Sheets

(56) References Cited

U.S. PATENT DOCUMENTS

| | | | | |
|---|---|---|---|---|
| 2010/0212740 | A1* | 8/2010 | Barth | H01L 31/048 136/259 |
| 2014/0041715 | A1* | 2/2014 | Carolan | E04D 3/352 156/60 |
| 2016/0344337 | A1* | 11/2016 | Cioffi | H02S 40/32 |

FOREIGN PATENT DOCUMENTS

| | | |
|---|---|---|
| DE | 10 2012 008 852 A1 | 11/2013 |
| FR | 2 947 099 A1 | 12/2010 |
| WO | 2013/046195 A1 | 4/2013 |
| WO | 2013/167110 A1 | 11/2013 |
| WO | 2016/139256 A1 | 9/2016 |

* cited by examiner

ROOF COVERING ELEMENT, SOLAR ROOF COVERING ELEMENT, ASSEMBLY OF SOLAR ROOF COVERING ELEMENTS, AND METHOD FOR PRODUCING A SOLAR ROOF COVERING ELEMENT

This application is a 35 U.S.C. § 371 National Stage Application of PCT/DE2019/000084, filed on Mar. 27, 2019, which claims the benefit of priority to Serial No. DE 10 2018 002 476.9, filed on Mar. 27, 2018 in Germany, the disclosures of which are incorporated herein by reference in their entirety.

TECHNICAL FIELD

The disclosure relates to a roof covering element, a solar roof covering element, an assembly of solar roof covering elements and a method for producing a solar roof covering element.

BACKGROUND

In the prior art, solar roof covering elements are known which consist of a flat main part formed, for example, by a roof tile or a roof stone, a solar module formed from silicon-based solar cells and a glass pane or a plastic layer forming the weather-resistant roof skin. The advantage of using such solar roof covering elements for the production of a solar roof system, which directly form the roof skin, is the structurally simple and aesthetically pleasing integration into the existing roof structure without separate carrier systems or elements.

Practical difficulties exist with regard to ensuring a sufficiently functionally reliable and standard-compliant contacting and interconnection of the electrical components in the implementation of a cost-effective production process suitable for mass production, as well as enabling simple and cost-effective roof mounting.

DE 10 2012 008 852 A1 and WO 2013/167110 A1, which claims priority of DE 10 2012 008 852 A1, disclose a roof stone with a plate-shaped main part made of cast material and a solar module arranged thereon, the main part having at least two holes in which lines are guided. Electrical cables, which are preferably already provided with contacts before they are guided through, and which are connected to the solar matrix of the solar module, are guided through the holes in the main part. DE 10 2012 008 852 A1 or WO 2013/167110 A1 do not suggest a specific configuration or production of this connection.

To produce an assembly from several roof stones, it is proposed that these are connected to one another via a parallel circuit, wherein simple plug contacts can be used.

DE 197 04 255 A1 discloses a solar roof tile, consisting of a roof tile and interconnected solar cells positioned in a recessed manner in the roof tile with connection contacts whose water vapor diffusion-tight contact is made on the back face of the roof tile. For this purpose, two contacting wires extending from the solar cells protrude into the roof tile in a through-bore. Permanent contact with the wires is made possible from the back face of the roof tile by means of a plug block or contact block. With regard to the implementation of a cost-effective, large-scale production process, the contacting disclosed by DE 197 04 255 A1 is disadvantageous insofar as relatively thin, dimensionally unstable contact wires are inserted within the through-bore into corresponding receptacles of the plug block or contact block which are positioned or partially inserted in the bore from the back face of the roof tile. The production of such a plug connection requires a high level of manufacturing precision to ensure a more secure connection to the plug block or contact block without the contact wires being bent in the process. In the case of automated production, this requires a high level of positioning precision in the approach paths and at the same time limits the possible production speed. In addition, the design as a purely physical plug connection has the disadvantage that even small manufacturing tolerances lead to errors in the plug connection or its load capacity and durability. In particular, high temperatures in summer due to strong solar radiation and high loads can lead to severe material aging and faults in the plug connection resulting therefrom. This can result in high contact resistance in the plug connections, which can lead to cable fires or smoldering fires.

WO 2013/046195 A1 discloses a composite insulation board with a photovoltaic module arranged on an upper face of the composite insulation board with a flat main part and an opening running perpendicularly to its main surface, in which two electric lines are guided in a common plug-in socket from the lower face through the opening, wherein the plug-in socket is attached to the lower face of the main part by screwing or gluing. On the upper face of the main part, a separate connection socket with contact means is pressed into the opening and the contact means of the connection socket are each connected to the lines of the plug-in socket by plug connections. The construction comprises a relatively large number of separate items and requires the production of a line connection within the opening as part of the manufacturing process, which makes a correspondingly high manufacturing precision of the individual parts and the manufacturing process necessary. The attachment of the separate individual components and the separate production of the electrical connection require a relatively complex and expensive manufacturing process.

SUMMARY

The disclosure is based on the object of avoiding the disadvantages shown. In particular, a roof covering element and a solar roof covering element are to be provided for a solar roof system, which can be produced by means of a cost-effective mass-production process and which enable a simple and cost-effective roof mounting.

The disclosure relates to a roof covering element with a flat main part, the upper face of which has a receiving surface for a solar module and which has an opening or a bore running perpendicularly to the main surface, at least two electric lines being guided together through that opening or bore and in which the lines end on the upper face of the main part in the region of the receiving surface as contact means, which are held or guided in an axially movable manner in a common flat connection socket, the electric lines being guided in a common plug-in socket from the lower face through the opening or bore and the plug-in socket on the lower face of the main part is held in an interlocking manner in an axial plug-in direction by a plug-in flange and on the upper face of the main part against its axial plug-in direction by a locking means in an interlocking and/or force-fitting manner and forms the connection socket on the upper face of the main part. For the purposes of the disclosure, a main part is to be understood as any flat construction element with which a sufficiently stable roof covering can be produced and which can be designed with a receiving surface for a solar module, for example roof tiles, roof stones or roof shingles made of clay, stone, concrete, cement, metal, glass, bitumen, plastic, wood or an organic or inorganic fiber composite. In the context of the disclosure, flat means that the main part has a greater extent in surface than in height. In the context of the disclosure, a support surface is to be understood as a region on the upper face of the main part, definable in terms of its length and width, on which a solar module can be arranged and mounted. The surface of the main part can be flat in the region of the support surface, but also curved, for example in the case of a brick-shaped main part having a wave profile. In the context of the disclosure, a solar module is understood to mean all electrical components with which sunlight can be converted directly into electrical energy, in particular photovoltaic modules made from one or more silicon or thin-film solar cell or solar cells. The solar module can be designed as a component with a planar body, for example as a plate-shaped cuboid, but also as a body with curved surfaces, for example a wave profile. The electric lines are used to transport electrical energy and, if necessary, also to transmit signals. They can either be designed as a common multi-core cable or as a bundle of several single-core cables. The lines form at least two contact means in the connection socket, which represent the two electric poles required to produce a current flow. The main part is easy to manufacture with a single opening or bore running perpendicularly to its main surface. Since all electrical connections are arranged on the upper face of the main part in a common flat connection socket as contact means, simple electrical connectivity with a solar module positioned on the support surface is made possible by means of a cost-effective, large-scale production process. According to the disclosure, the electric lines are guided in a common plug-in socket from the lower face through the opening or bore, wherein the plug-in socket on the lower face of the main part is held in an interlocking manner in the axial plug-in direction by a plug-in flange and on the upper face of the main part in an interlocking and/or force-fitting manner against its axial plug-in direction by a locking means and forms the connection socket on the upper face of the main part. The plug-in socket is designed together with the connection socket as a one-piece component or as a prefabricated component assembly. This enables the electric lines to be guided through the main part in a stable and simple manner within the scope of the manufacturing process. Furthermore, this enables the roof covering element to be manufactured with relatively large manufacturing tolerances, for example in the dimensioning of the opening or hole, since the plug-in socket and the connection socket are held stable in the main part by the plug-in flange located on the lower face of the main part and the locking means located on the upper face of the main part.

To seal the electrical connection against moisture penetrating from the lower face of the main part, a sealing element is arranged between the plug-in flange and the lower face of the main part. The sealing element can be a hardening or permanently elastic material such as rubber, silicone or an elastomer.

In a simple embodiment, the plug-in flange is held on the upper face of the main part by a clamp or a snap ring as a locking means.

In a stable embodiment, the locking means is a hollow element which is configured with a retaining flange acting on the upper face of the main part against the axial plug-in direction of the plug-in socket and which engages with an inner connecting-link in an interlocking manner or with a corresponding outer connecting-link of the plug-in socket in an interlocking and/or force-fitting manner. This enables the plug-in socket to be locked by placing the hollow element against the axial plug-in direction of the plug-in socket.

For an interlocking connection that can be produced in a structurally simple manner, the hollow element is an outer sleeve which engages a corresponding plug-in section of the plug-in socket with a screw connection or a plug-in rotary connection (bayonet lock). The plug-in socket is locked by placing the hollow element against the axial plug-in direction of the plug-in socket in a screwing movement or a plug-in rotary movement.

For an interlocking and force-fitting connection that can be produced in a structurally simple manner, the hollow element is an outer sleeve which is slotted in the axial plug-in direction and which engages in a latching manner on a corresponding plug-in section of the plug-in socket. The plug-in socket is locked by placing the hollow element against the axial plug-in direction of the plug-in socket in a plug-in movement, the outer sleeve engaging on the plug-in section.

To seal the electrical connection against moisture that can penetrate between the upper face of the main part and the lower face of a solar module that can be arranged on it, a sealing element is arranged on the upper face of the retaining flange.

A simple mechanical production of the electrical connection with a solar module positioned on the support surface by means of a cost-effective large-scale production process is made possible by the contact means protruding from the connection socket and guided in it in a spring-loaded manner against the plug-in direction. A stable electrical connection is hereby possible simply by producing a combined interlocking and force-fitting connection of corresponding contacts against the spring load.

The production of a permanent electrical connection with a solar module positioned on the support surface by means of a cost-effective production process suitable for large-scale production is made possible simply by holding the contact means in the connection socket firmly or with an axial deformation clearance. This ensures, for example, the simple production of a soldered connection on the upper face of the main part. To facilitate such a soldered connection by means of a cost-effective production method suitable for large-scale production, the contact means are formed from a solder material or are designed with a solder coating.

Alternatively, the production of a permanent electrical connection with a solar module positioned on the support surface by means of a cost-effective mass-production process simply enables the plug-in socket to be designed with an insertion channel or two insertion channels for a soldering tool, which is or which are accessible via an access opening on the lower face of the plug-in socket and via which a contact to the contact means can be established. In this configuration, the roof covering element can be soldered from the lower face of the main part and the plug-in socket. The soldering tool can be brought into direct physical contact with the contact means. After the soldering, the insertion channel or channels are closed with a sealant in order to ensure the electrical insulation of the contact means and to protect them from external weather influences. In a further improvement of this embodiment the insertion channel or channels are not designed to be open at the upper end, but rather ends or end at its or their upper end at an effective distance from the contact means. In this configuration variant, the roof covering element can be soldered from the lower face of the main part and the plug-in socket by means of an induction soldering tool. The effective distance of the upper end of the insertion channel or channels is selected here in such a way that sufficient energy input to the contact means is ensured by an induction soldering tool inserted into the insertion channel. Since the insertion channel or channels is or are not designed to be open at the upper end, the electrical insulation and weather protection of the contact means is guaranteed.

To facilitate the roof mounting of the roof covering element, the lines end on the lower face of the main part or below the lower face at a distance from the lower face as contacts in a multi-pole plug connector. The lines form at least two contacts in the plug connector, which represent the two electric poles required to produce a current flow. The lines can be easily and flexibly connected to further components of a solar roof system via the plug connector. In order to be able to overcome a connection path if necessary without the interposition of an extension cable, the lines end only at a distance from the lower face as contacts in the plug connector. For this purpose, the lines are first guided out of the opening or bore or, if one is provided, out of the plug-in socket, for example, as a common cable, the cable being formed at its end with the multi-pole plug connector.

A simple electrical connection test is made possible for the roof covering element in that a capacitor is provided which is connected between the lines, contacts or contact means that form the two electric poles. When the roof covering element is connected to a circuit, the presence of the capacitor can easily be determined electrically by means of a measurement with an alternating voltage signal. Solar modules work exclusively with DC voltage, for which the capacitor is "invisible" during operation, so it does not have a disruptive or hindering effect. In this way, the desired function (generation of electrical energy on the basis of direct voltage) is not impaired by the measuring function, which is carried out via an alternating current signal. When interconnecting a large number of roof covering elements, the number of successfully connected capacitors and thus the number of successfully connected roof covering elements can be simply counted or detected in this way.

To provide a non-return valve, a reverse current diode is arranged in the line or lines which depict at least one electric pole. When connecting a large number of roof covering elements with solar modules in a parallel connection, an electrical fault in one of the connected solar modules can lead to the remaining solar modules feeding the current they emit into the defective solar module, which can lead to overheating and trigger a fire. In order to prevent this, a diode is arranged in the line or lines of the roof covering element that depict at least one electric pole in a suitable direction so that it enables the flow of current (energy output) from the solar module, but prevents the flow of current into the solar module (energy consumption), i.e., serves as a non-return valve.

In a particularly compact embodiment, in which the lines end as contacts in a common connector below the lower face of the main part, the capacitor and/or the reverse current diode is or are arranged within the plug connector.

For use as a solar roof covering element, a solar module is arranged on the upper face of the main part, which has back contact means, for example in the form of metal plates, on its face facing the upper face of the main part, which are arranged corresponding to the contact means.

If at the same time the contact means protrude from the connection socket and are spring-loaded against the plug-in direction, a stable electrical connection is made with the solar module by placing it with the back contact means on the contact means against their spring load and connecting the components to one another.

If, on the other hand, the contact means are fixed in the connection socket or are held with an axial deformation clearance, a stable electrical connection is made with the solar module by placing the latter with the back contact means on the contact means and establishing a soldered connection. To facilitate such a soldered connection by means of a cost-effective mass production process, either the contact means or the back contact means or both the contact means and the back contact means are made of a solder material or are formed with a solder coating.

For the purpose of use as a solar roof covering element, it is particularly advantageous if the solar module has a cell matrix made up of several solar cells connected in series. Individual cells are usually available on the market with dimensions of about 15 cm×15 cm and, under load, usually have a power output with high currents of about 8 A at a low voltage of about 0.5 V. By using a cell matrix with a plurality of smaller cells instead, cells that are connected in series achieve a comparable power output with relatively lower currents at a relatively higher voltage. By using a cell matrix of, for example, 50 to 100 smaller cells that are connected in series, for example, a comparable power output can be achieved with relatively low currents of around 0.2 A at a higher voltage of around 50 V to 60 V compared to conventional single cells available on the market. With small cells, a significantly better surface coverage of the main part used in each case can be achieved at the same time by choosing the format, number and assembly of the small cells so that the available receiving surface of the main part is covered as far as possible while taking into account the respectively desired total voltage. For this purpose, single cells available on the market in the usual formats can be cut into smaller cells with the desired dimensions—e.g. with a laser—and rearranged and packaged as a cell matrix.

To protect the electrical components from moisture and to ensure adequate weather resistance, the upper face of the solar roof covering element forming the roof skin is formed by a glass pane or a plastic pane or plastic film. This can also be the upper face of the solar module.

To produce a solar system, the solar roof covering elements are preferably connected to one another in a parallel circuit. On the one hand, this offers the advantage that shading one or more solar modules—for example, by leaves or dirt—only ever leads to a reduction in the system output by the output of the solar module or solar modules concerned. On the other hand, the voltage of the entire system is kept constant regardless of the number of interconnected solar roof covering elements. With the number of connected solar modules, only the output and electricity of the entire system change. This ensures that the voltage of the solar system can always be kept within the limit values of the low voltage (voltage range I according to IEC 60449) regardless of the total number of connected solar modules. The combination of parallel connection and low-voltage operation reduces the costs and complexity of planning and designing the entire system, because this is associated with reduced requirements for electrical wiring as well as for the design of electrical wiring, connections and insulation. Ultimately, this is also associated with significantly lower risks for the personnel carrying out the mounting and connection of the system. The mounting of the solar roof covering elements on the roof can therefore take place without special electro-technically trained or trained specialists, for example also by roofers.

Practical experience has shown that the total voltage achievable with the use of a cell matrix made up of a large number of smaller solar cells connected in series with one another can still be too low. From a practical manufacturing point of view, the available receiving surface can only be used with a cell matrix of 50 to a maximum of 100 solar cells connected in series with one another, for example, even with standard large formats of roof tiles or roof stones. With this, in practice, under load, a total voltage of a maximum of approximately 50 V to 60 V per solar module can typically be achieved, which can still be too low with an effective design of a solar roof system. In the case of roof covering elements with a smaller main surface that can be used as a receiving surface, such as beaver tails, only one receiving surface with a cell matrix of a maximum of 18 or 20 solar cells connected in series and thus a correspondingly lower total voltage per solar module can be used. In these cases, a more favorable, higher total voltage, but still within the limit values of the low voltage, can be achieved by connecting at least two solar roof covering elements in groups to one another in a series connection and by connecting the solar roof covering element groups in series to one another in a parallel connection.

Practical experience has shown that a total voltage of a maximum of 80 to 120 V under load is desirable for the effective design of a solar roof system with solar roof covering elements, whereby the limit values of the low voltage are still complied with, but also completely or almost fully exhausted. To ensure this, the number of solar roof covering elements connected to one another in a series connection is designed for a total voltage of a maximum of 80 V to 120 V.

In the above embodiment, a structurally simple and effective roof mounting is guaranteed, in that the lines of the solar roof covering elements each end below the lower face of the main part in a multi-pole plug connector means and the solar roof covering elements can be connected to one another in groups via a common multiple plug connection means and can be connected in series, the series connection being established by a suitable line routing inside the multiple plug connection means, and the solar roof covering element groups can each be connected to the main lines via the multiple plug connection means and can be connected in parallel with one another. The series connection is implemented via a suitable internal line routing in the multiple plug connection means.

A further simplification, based on the above embodiment, consists in that the multiple plug connection means each engage with two penetration contacts on two different electric poles of the main lines. A penetration contact is to be understood as a contact means with which a permanent contact with the line of a cable can be established in that it penetrates the insulation layer and any existing cable sheath. This can, for example, be a spike that is shot through the cable. This can also be an insulation displacement contact. The multiple plug connection means each engage with one penetration contact on a positive pole and with the other penetration contact on a negative pole of the main lines. The particular advantage of this embodiment is that the main lines can be pre-assembled together as cables with the multiple plug connection means and provided as roll goods and processed during the mounting of the solar roof system. The mounting of the multiple plug connection means can be carried out simply with the penetration contacts on an already pre-assembled cable without the insulation and the cable sheathing having to be separately removed beforehand at the contact points.

For the simple production of a solar roof covering element, in which the contact means protrude from the connection socket and are guided in this against the plug-in direction in a spring-loaded manner, the solar module is arranged on the receiving surface, a force-fitting connection between the contact means and the back contact means being established against the spring load of the contact means.

For the simple production of a solar roof covering element, in which the contact means are held firmly in the connection socket or with an axial deformation clearance and the contact means and/or the back contact means are formed from a solder material or formed with a solder coating, the solar module is arranged on the receiving surface and a heating of the common contact surfaces of the contact means with the back contact means up to the melting point of the solder causes an energy input through the solar module. The heating can take place in a structurally simple manner by induction soldering.

For the simple production of a solar roof covering element, in which the contact means are held firmly in the connection socket or with an axial deformation clearance and the contact means and/or the back contact means are formed from a solder material or are formed with a solder coating, and wherein the plug-in socket is formed with an insertion channel or two insertion channels for a soldering tool, which is or are accessible via an access opening on the lower face of the plug-in socket and via which contact to the contact means can be established, the solar module is arranged on the receiving surface and the common contact surfaces of the contact means are heated with the back contact means up to the melting point of the solder by a soldering tool inserted into the insertion channel or successively inserted into the insertion channels, or by two soldering tools inserted simultaneously in parallel into the insertion channels. In this configuration of the method, the soldering of the solar roof covering element is made possible from the lower face of the main part and the plug-in socket. The soldering tool can be brought into direct physical contact with the contact means. The insertion channel or channels are closed with a sealant after the soldering has taken place in order to ensure the electrical insulation of the contact means and to protect them from external weather influences. In a further improvement of the production method, the insertion channel or channels are not designed to be open at the upper end, but rather ends at his or her upper end at an effective distance from the contact means. In this configuration variant, the energy input required for the soldering is ensured by an induction soldering tool inserted into the insertion channel or successively inserted into the insertion channels, or by two induction soldering tools inserted in parallel into the insertion channels. The effective distance of the upper end of the insertion channel or channels is selected here in such a way that sufficient energy input to the contact means is ensured by an induction soldering tool inserted into the insertion channel. Since the insertion channel or channels is or are not designed to be open at the upper end, the electrical insulation and weather protection of the contact means is guaranteed.

Figure 2:
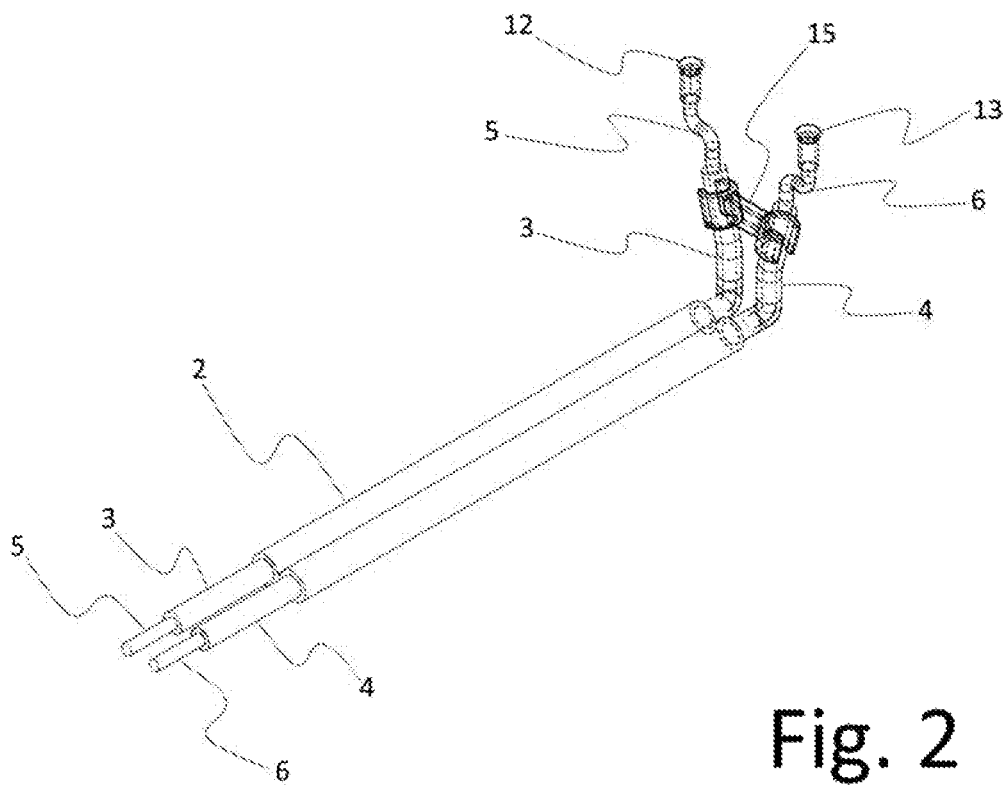
Figure 3:
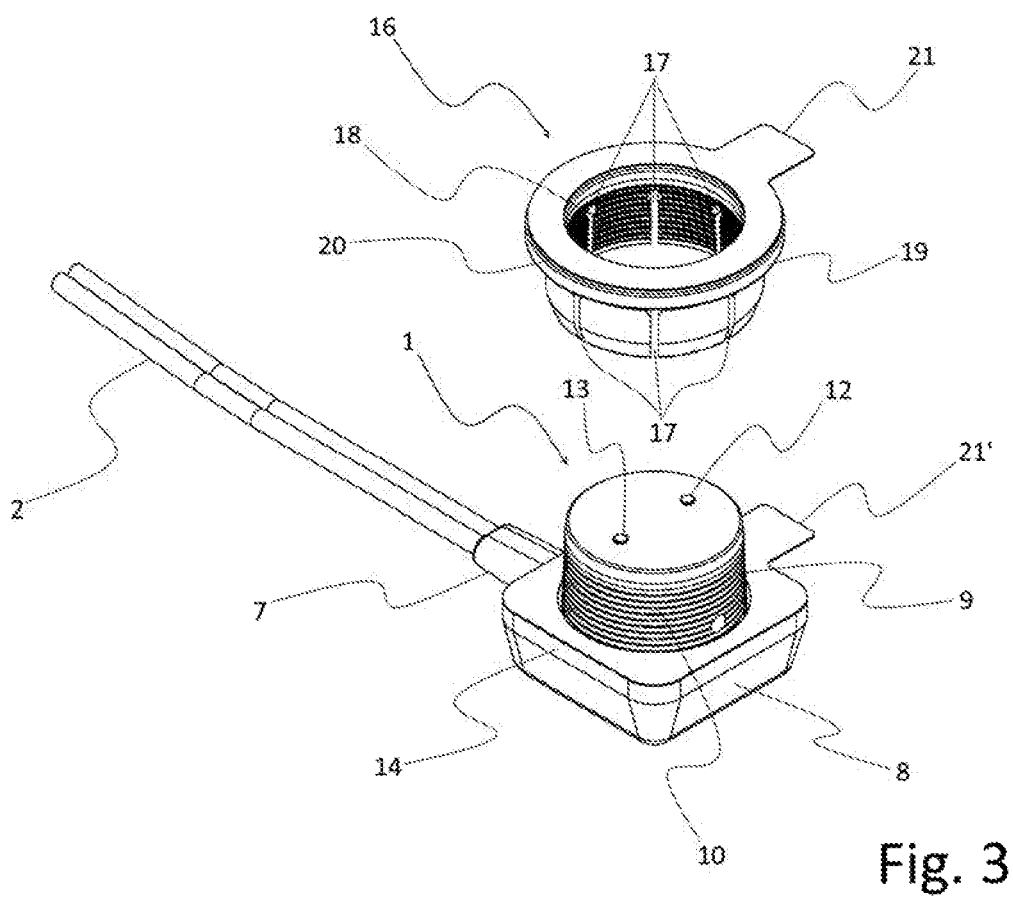
Figure 4:
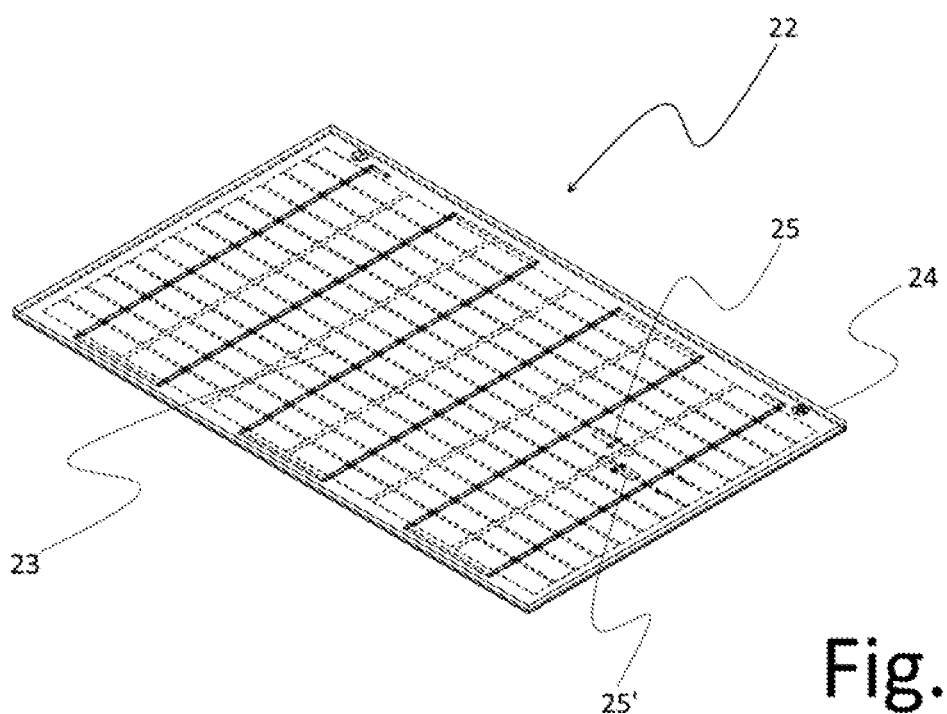
Figure 5:
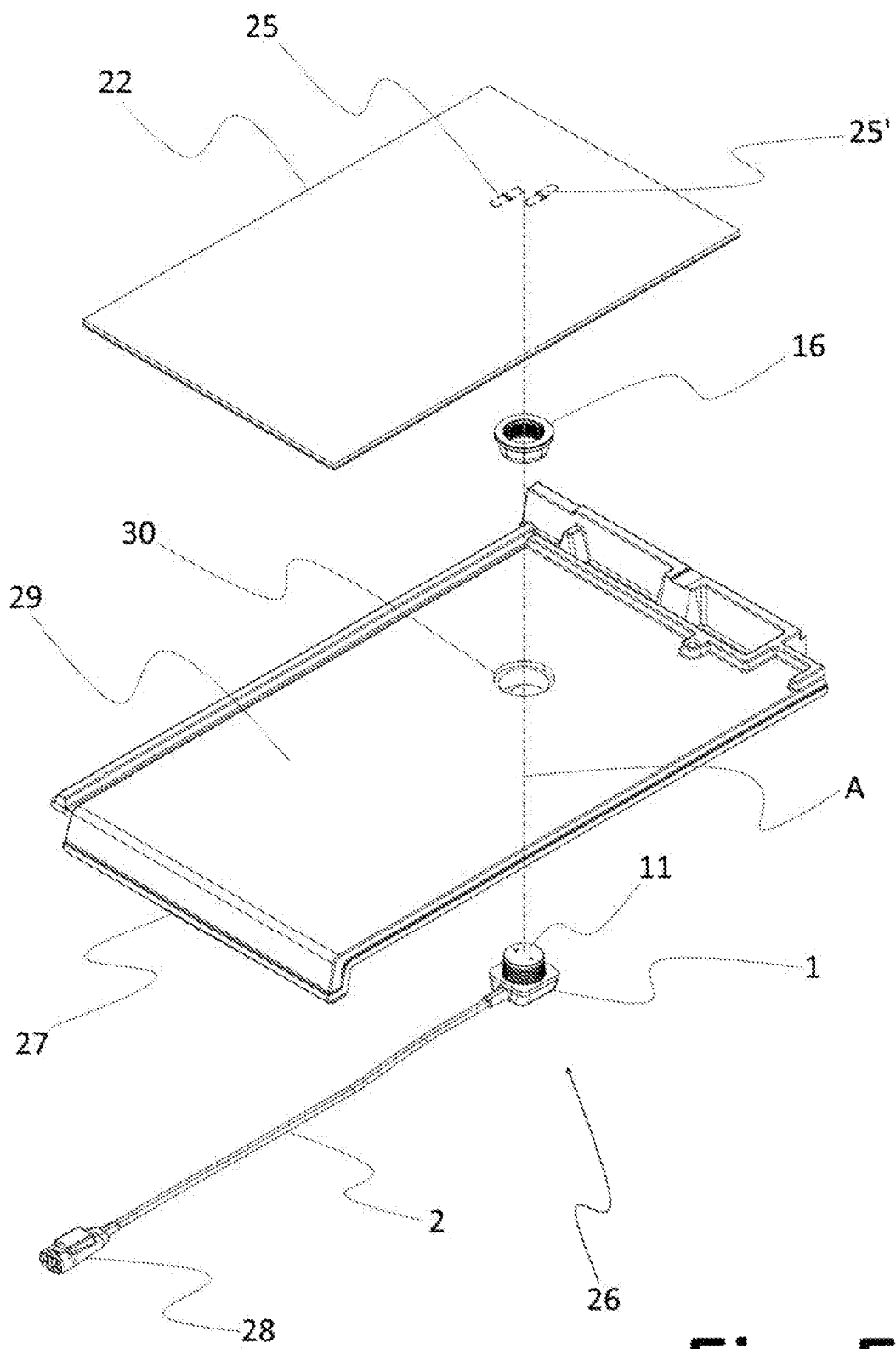
Figure 6:
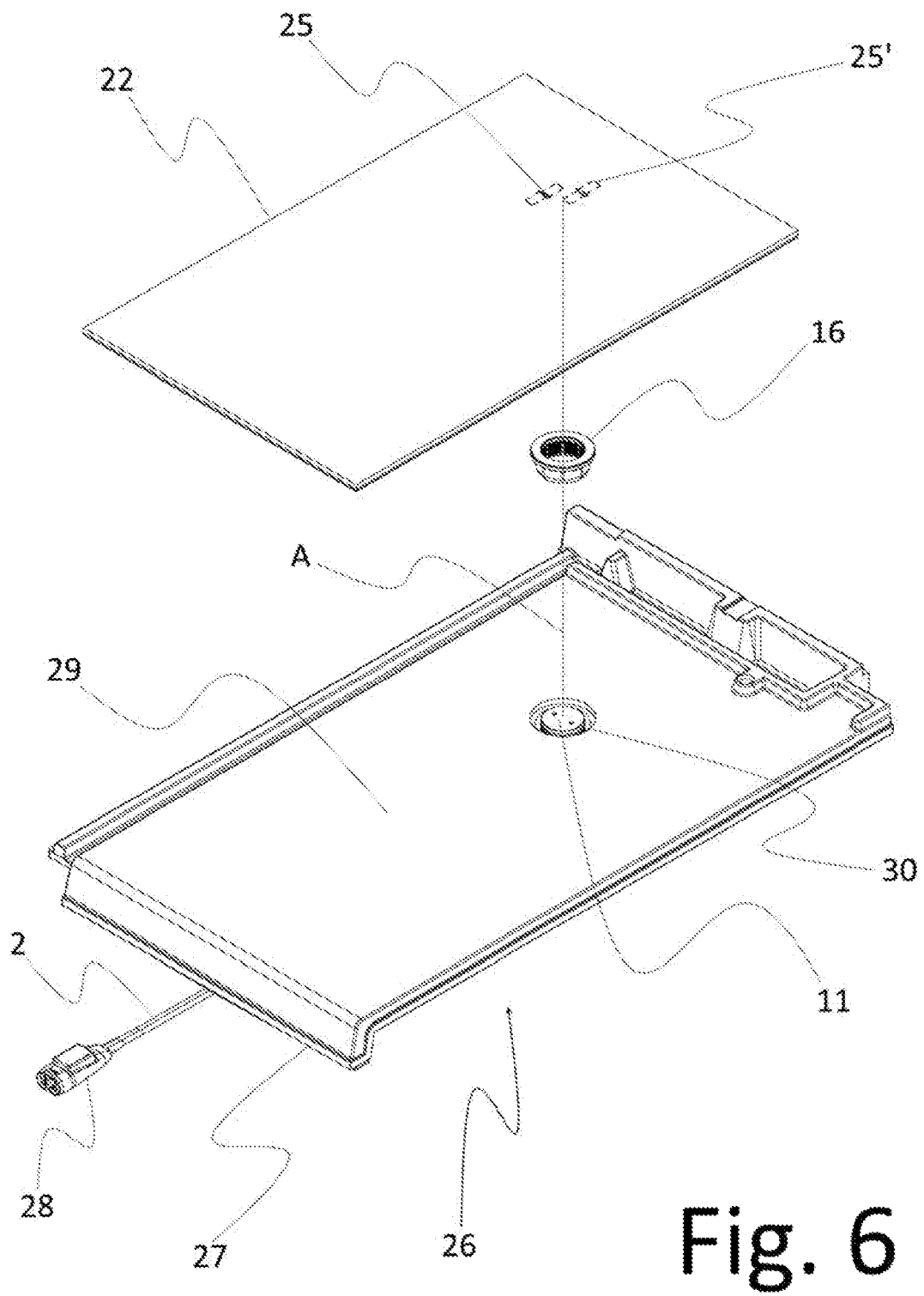
Figure 7:
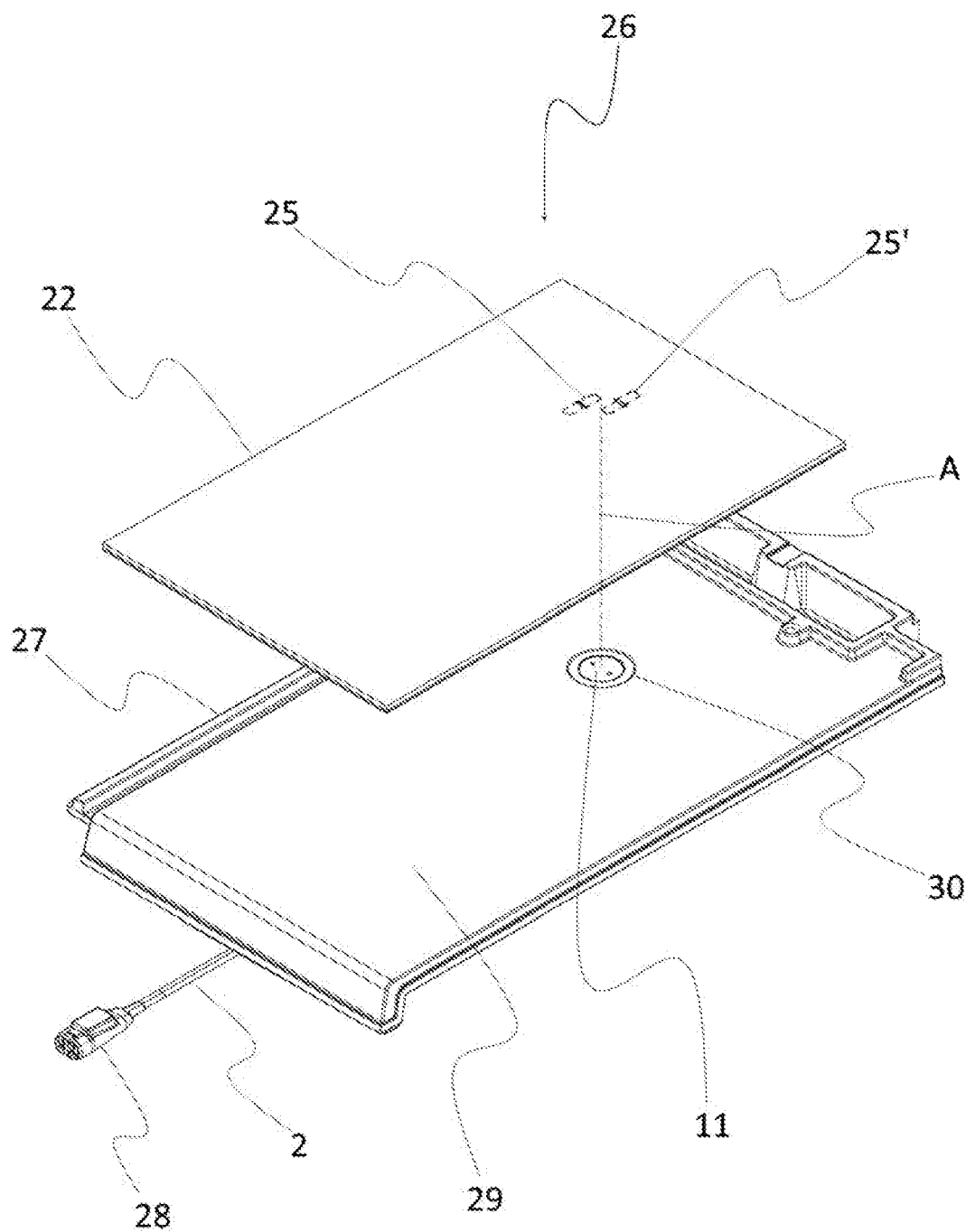
Figure 8:
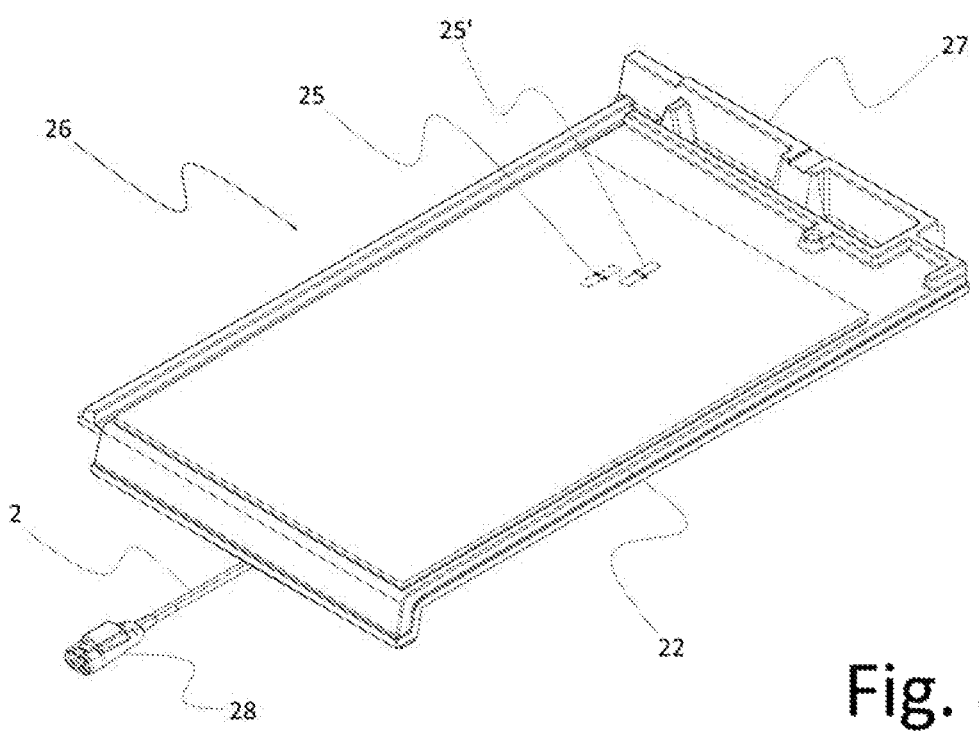
Figure 9:
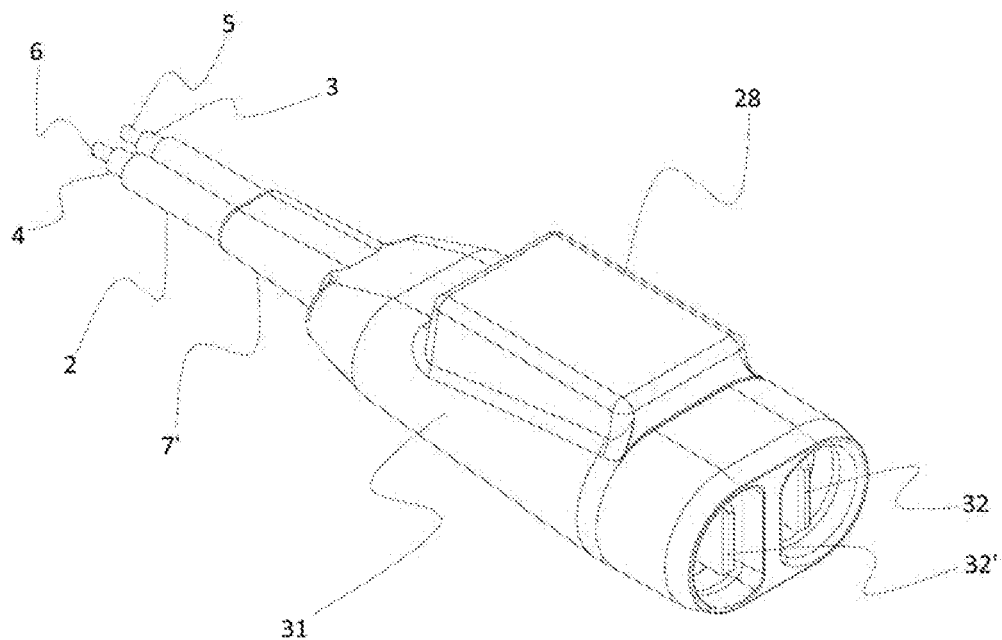
Figure 10:
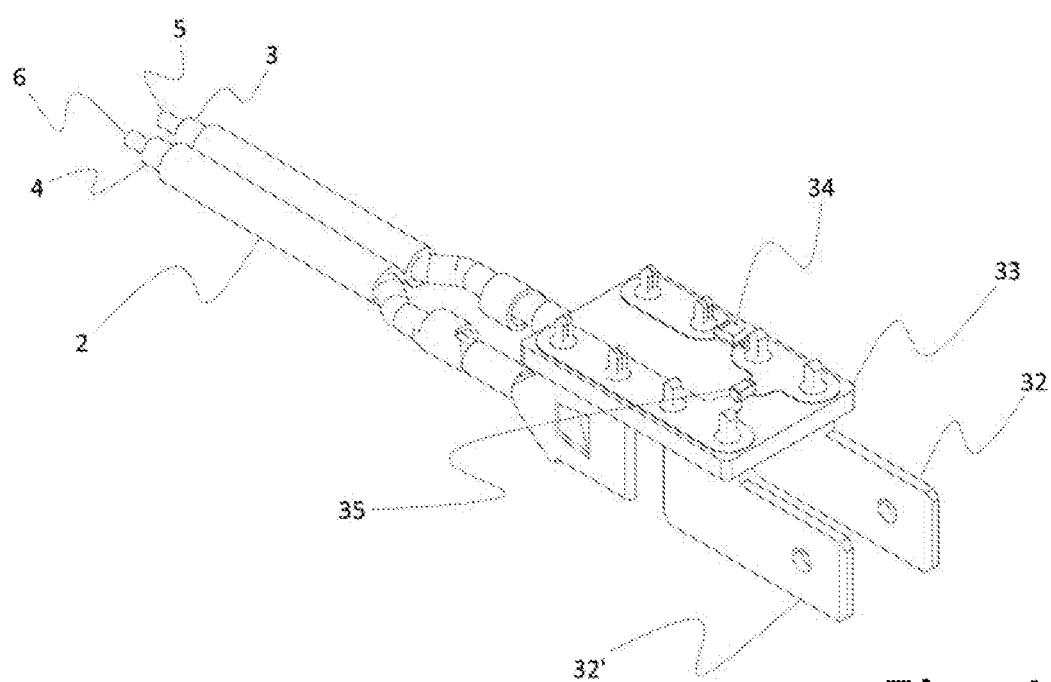
Figure 11:
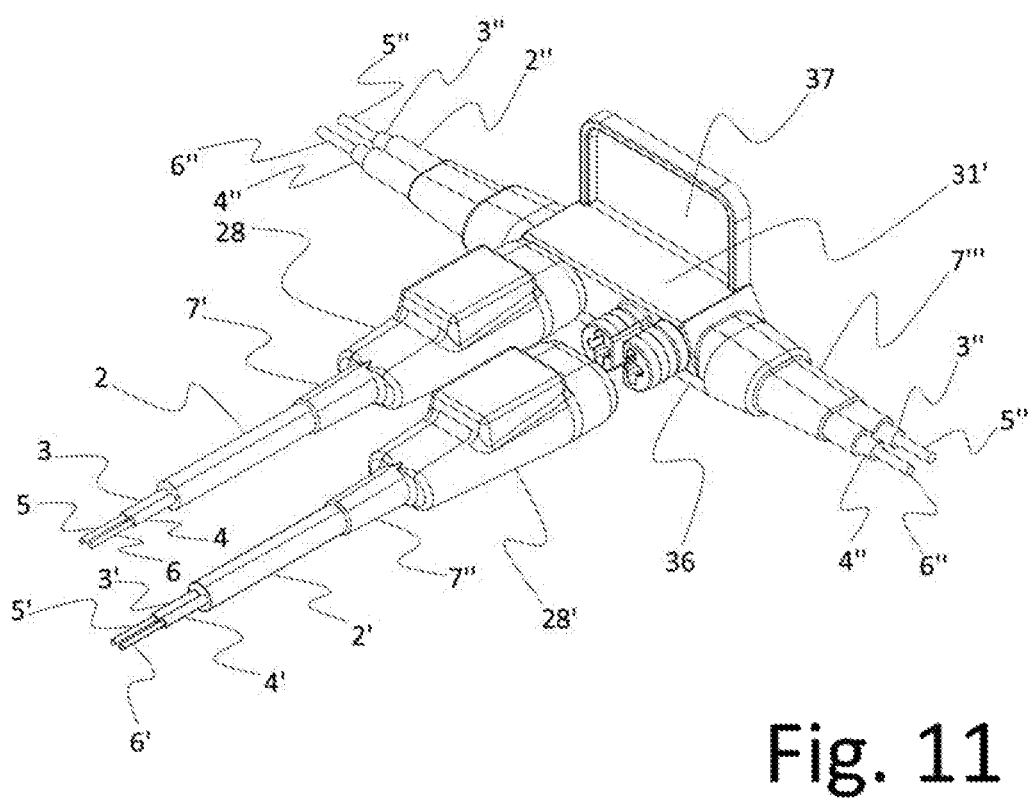
Figure 12:
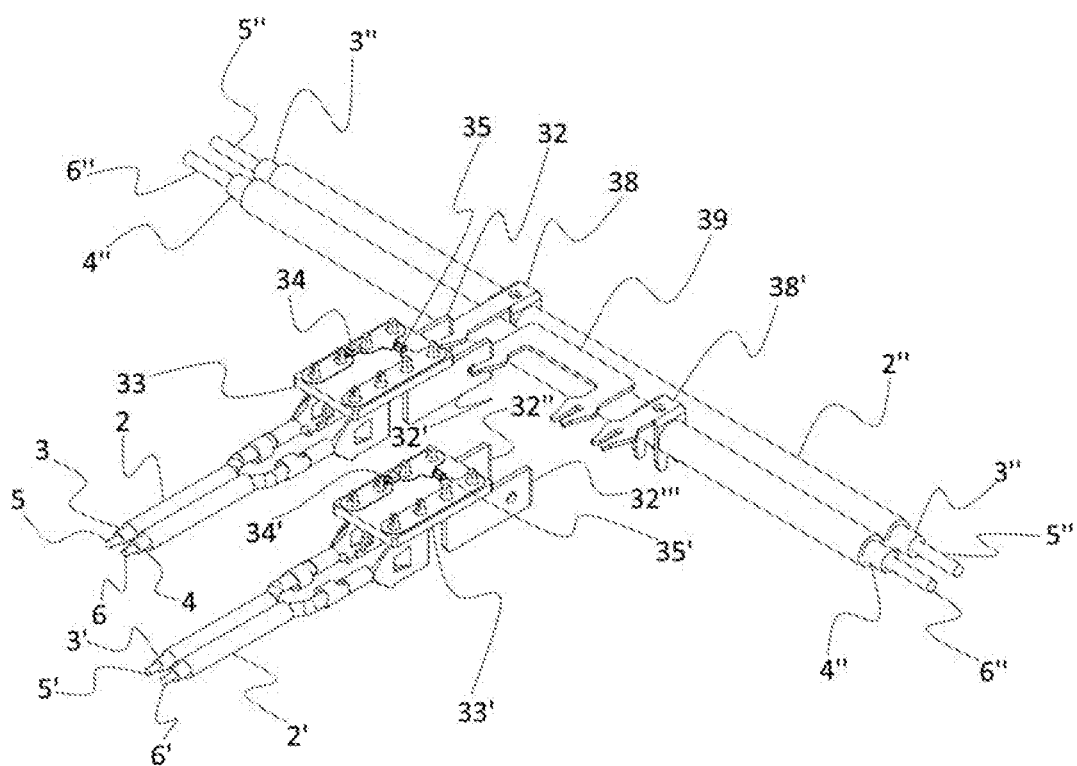
Figure 13:
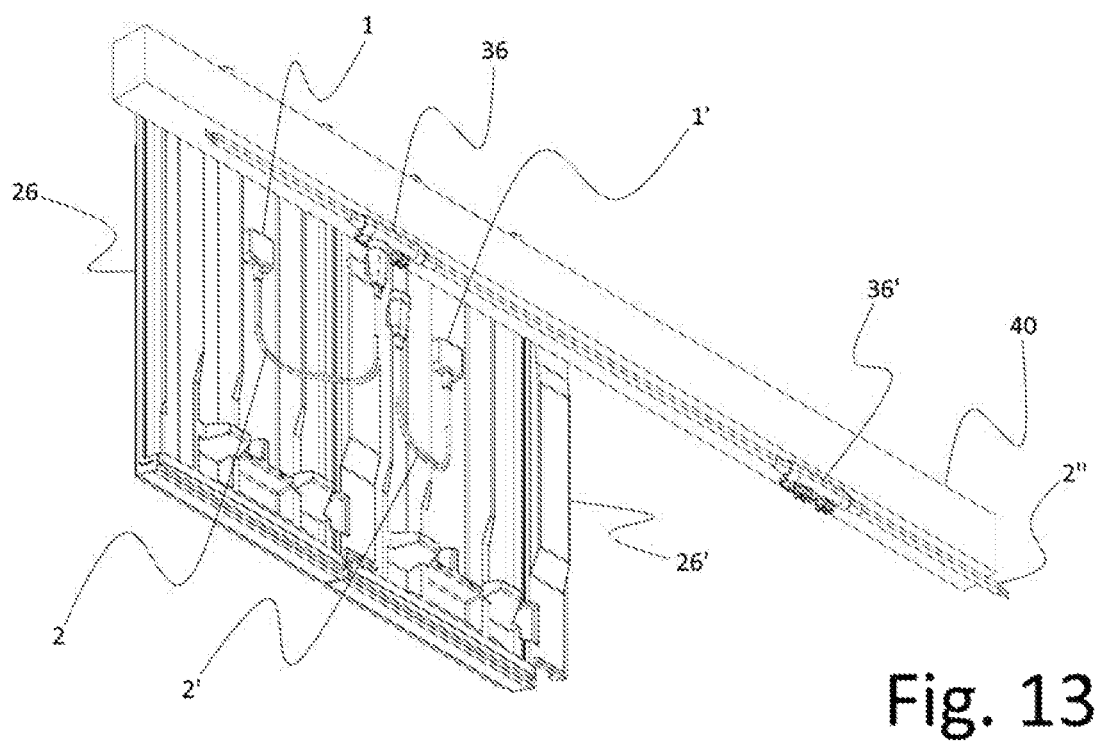
Figure 14:
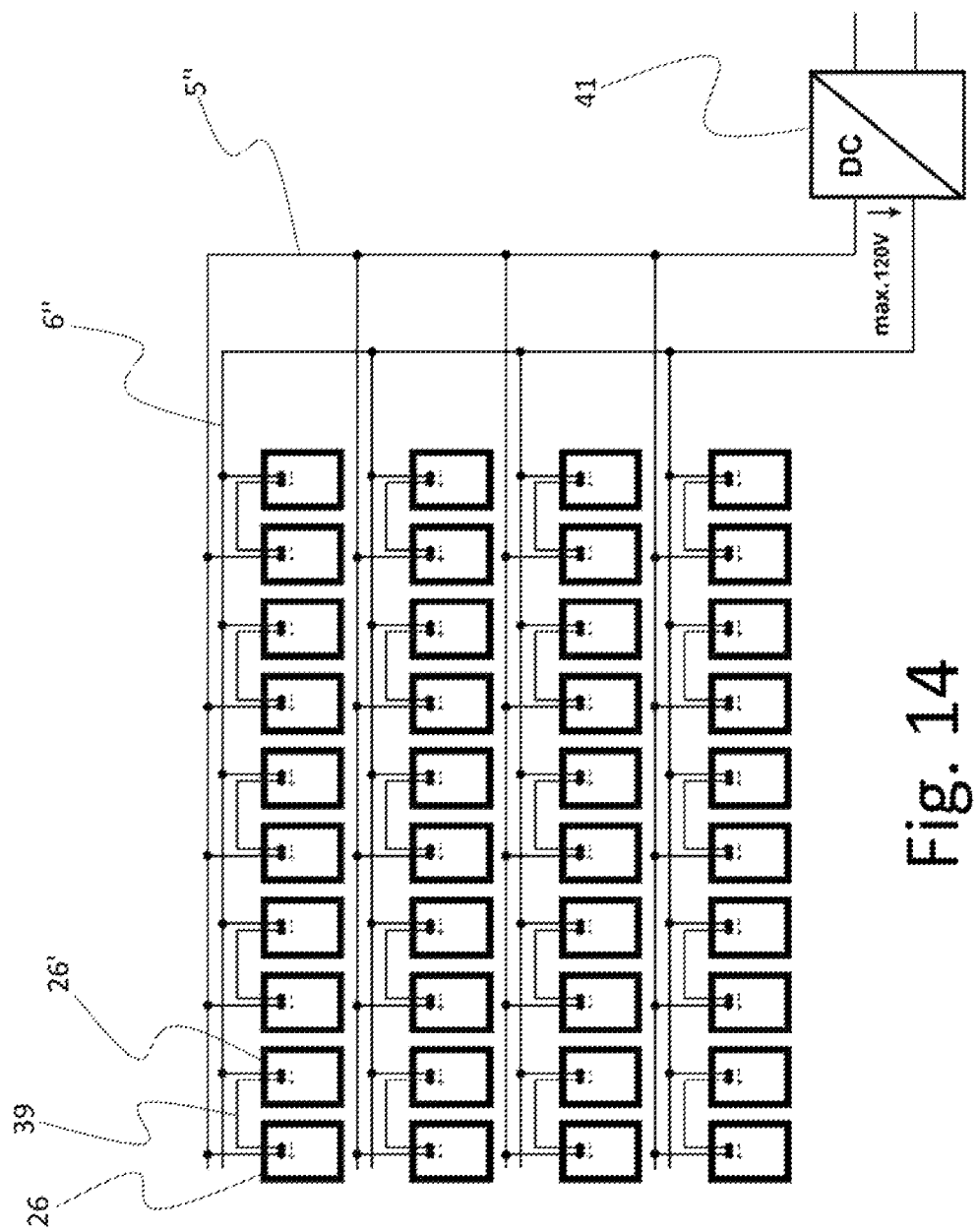

Further advantages of the disclosure are shown below together with the description of a preferred embodiment of the disclosure with reference to FIGS. 1 to 15. The figures show as follows:

FIG. 1 a perspective view of a plug-in socket,

FIG. 2 a perspective view of the course of a cable within the plug-in socket shown in FIG. 1, FIG. 3 the plug-in socket shown in FIG. 1 with an outer sleeve as a perspective exploded view, FIG. 4 a solar module in a partially transparent, perspective view, FIG. 5 a perspective exploded view of a solar roof covering element, FIG. 6 a further perspective exploded view of the solar roof covering element according to FIG. 5, FIG. 7 a further perspective exploded view of the solar roof covering element according to FIGS. 5 and 6, FIG. 8 a perspective view of the solar roof covering element according to FIGS. 5 to 7, FIG. 9 a perspective view of a plug connector, FIG. 10 a perspective view of the internal components of the plug connector shown in FIG. 9, FIG. 11 a perspective view of a double plug connection means and two plug connectors, FIG. 12 a perspective view of the inner components of the double plug connection means and the plug connector shown in FIG. 11, FIG. 13 a perspective view of an assembly of two solar roof covering elements on a roof batten, FIG. 14 a schematic representation of the circuit of an assembly of several solar roof covering elements.

Figure 15:
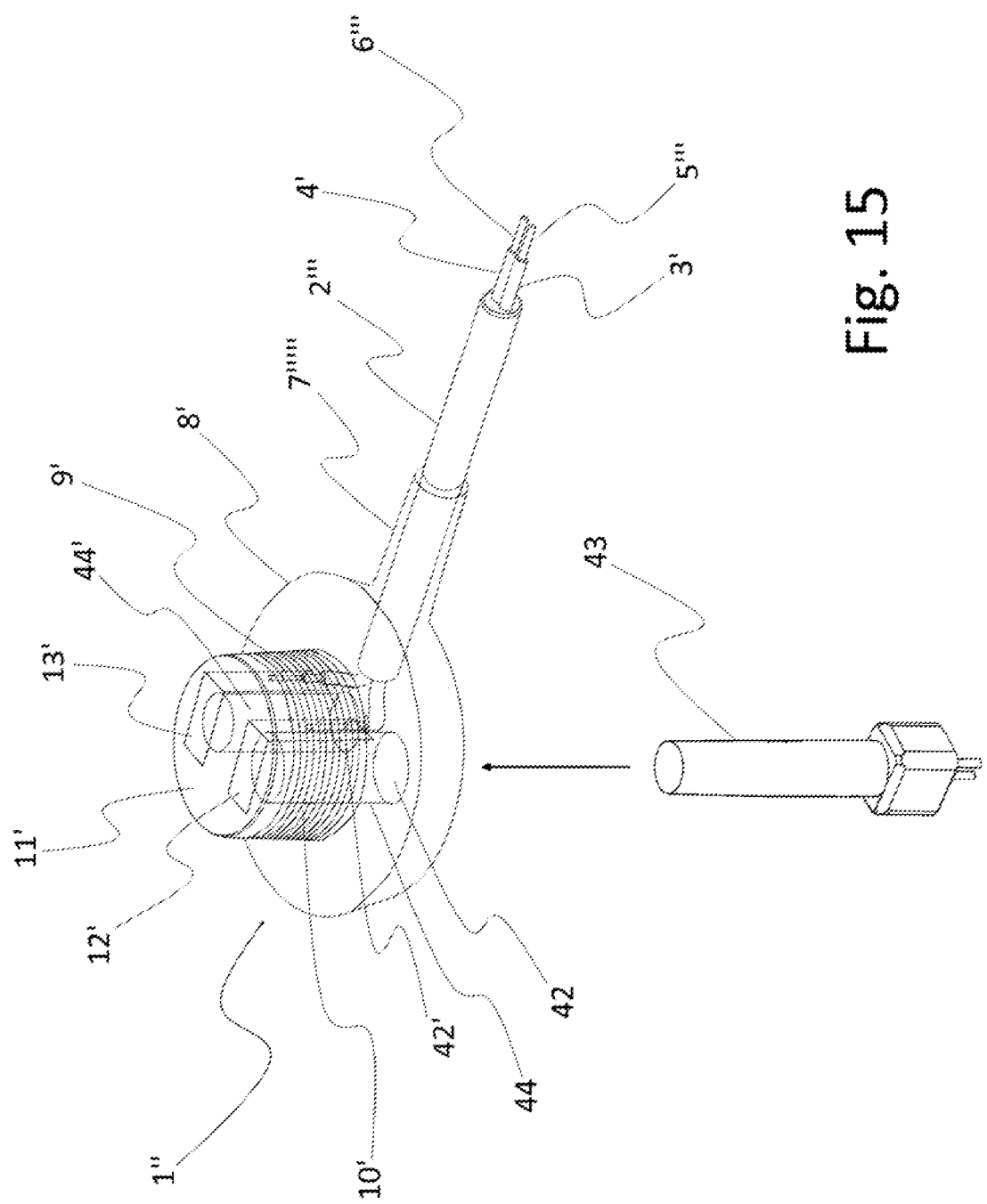

FIG. 15 a perspective, partially transparent view of an alternative embodiment of a plug-in socket with an induction soldering tool.

FIG. 1 shows a perspective view of the plug-in socket 1 into which the two-core cable 2 opens. In the cable 2, the two electric lines 5 and 6, each designed as copper wires with wire insulation 3 and 4, are guided within a common cable sheath. The plug-in socket 1 is formed with the kink protection 7, the cuboid plug-in flange 8 and the conical plug-in section 9. In the region of the lateral surface of the plug-in section 9, the plug-in socket 1 is formed with the lamellar outer connecting-link 10. On its upper face, the plug-in socket 1 forms the flat connection socket 11, in which the lines 5 and 6 end on the top surface of the plug-in section 9 as contact means 12 and 13. The contact means 12 and 13 form the two electric poles required to produce a current flow to a solar module. On the plug-in flange 8, the flat seal 14 is arranged, which is made of foam rubber and is formed on its surface with an adhesive coating (not shown in FIG. 1).

FIG. 2 shows the course of the cable 2 within the plug-in socket 1 in a perspective view. The lines 5 and 6 are held within the plug-in section 9 with the double clamp 15 which engages the wire insulation 3 and 4. The two contact means 12 and 13, which are each designed as a copper body with a tin coating, are placed on the ends of the lines 5 and 6, which are designed as copper wires. The contact means 12 and 13 are held in the connection socket 11 with a slight axial deformation clearance, but otherwise firmly. The slight axial deformation clearance of the lines 5 and 6 results from the kinked line routing of the lines 5 and 6 between the double clamp 15 and the contact means 12 and 13 in the plug-in section 9 of the plug-in socket 1. For this purpose, the contact means 12 and 13 initially protrude slightly from the connection socket 11. When a workpiece with corresponding contacts is placed on top, the lines 5 and 6 yield slightly due to deformation in the region of the line kinks. This deformation is partially plastic (irreversible) due to a further bending of the lines 5 and 6 in the kink region, but also partially elastic (reversible) due to a limited elasticity of the lines 5 and 6 in the kink region. Due to the elastic component of the deformation movement, a reliable contact closure of the contact means 12 and 13 to the corresponding contacts is ensured in that a slight spring force is exerted on the contact connection by the lines 5 and 6. This serves to ensure a clean soldered connection of the contact means 12 and 13 with the corresponding contacts and to facilitate the production of the soldered connection in practice.

FIG. 3 shows the plug-in socket 1 with the outer sleeve 16 in a perspective exploded view. The outer sleeve 16 is formed with axial slots 17, a lamellar inner connecting-link 18 and the retaining flange 19. A flat seal 20 is arranged on the retaining flange 19, which is made of foam rubber and is formed on its surface with an adhesive coating (not shown in FIG. 3). The adhesive coatings (not shown in FIG. 3) of the seals 14 and 20 are each covered with protective films 21 and 21'. The segments of the outer sleeve 16 formed by the axial slots 17 serve to encircle the plug-in section 9 of the plug-in socket 1. Here, the lamellae of the inner connecting-link 18 of the outer sleeve 16 engage the lamellae of the corresponding outer connecting-link 10 of the plug-in section 9 in a latching manner.

FIG. 4 shows the solar module 22 in a partially transparent, perspective view. The solar module 22 comprises a cell matrix 23 consisting of a multiplicity of small solar cells which are connected in series with one another and a glass pane 24 arranged above it. The cell matrix is designed for a power output under full load with currents of about 0.2 A at a voltage of 50 V. To establish an electrical connection, two back contact means 25 and 25' formed from small metal plates are arranged on the lower face of the solar module 22 and connected to the series connection of the cell matrix 23. The back contact means 25 and 25' are each designed as a copper body with a tin coating.

FIGS. 5 to 7 show the solar roof covering element 26 each in perspective exploded views. FIG. 8 shows the fully assembled solar roof covering element 26 in a perspective view. The solar module 22 is only shown schematically in FIGS. 5 to 8, the cell matrix 23 is not shown here. The solar roof covering element 26 comprises the plug-in socket 1, the main part 27, the outer sleeve 16 and the solar module 22. The cable 2 of the plug-in socket is formed below the lower face of the main part 27 at a distance therefrom having the plug connector 28 at its end. The main part 27 is designed as a flat, tile-shaped roof stone. The upper face of the main part 27 has a receiving surface 29 for the solar module 22. In the region of the receiving surface 29, the main part 27 is also formed with an opening 30 running perpendicularly to its main surface. To produce the solar roof covering element 26, the plug-in socket 1 is fixed in a workpiece carrier (not shown) so that the connection socket 11 is oriented upwards. The main part 27 is placed on the connection socket along the plug-in axis A, so that the plug-in section 9 of the plug-in socket 1 is received in the opening 30 of the main part 27 and the connection socket 11 is arranged approximately on the plane of the upper face of the main part 27, as shown in FIG. 6. In this case, the plug-in socket 1 is held on the lower face of the main part 27 by the plug-in flange 8 in an interlocking manner in the axial plug-in direction. Furthermore, the seal 14 is here for sealing the electrical connection against penetrating moisture from the lower face of the main part 27 arranged between the plug-in flange 8 and the lower face of the main part 27. Then, as shown in FIG. 7, the outer sleeve 16 is inserted into the opening 30, the segments of the outer sleeve 16 formed by the axial slots 17 encompass the plug-in section 9 of the plug-in socket 1 and the lamellae of the inner connecting-link 18 of the outer sleeve 16 engage latchingly onto the lamellae of the corresponding outer connecting-link 10 of the plug-in section 9. In this case, the plug-in socket 1 is held on the upper face of the main part 27 by the retaining flange 19 of the outer sleeve 16 against the axial plug-in direction. Furthermore, for sealing the electrical connection against moisture that can penetrate between the upper face of the main part 27 and the lower face of the solar module 22, the seal 20 is arranged on the upper face of the retaining flange 19 of the outer sleeve 16. In FIG. 8, the ready-made solar roof covering element 26 is shown, in which the solar module 22 is placed on the receiving surface 29 of the main part 27. In this case, the back contact means 25 and 25' are arranged in an interlocking manner on the contact means 12 and 13, wherein due to the axial deformation clearance of the lines 5 and 6 in the plug-in section 9 of the plug-in socket 1 a secure contact connection between the contact means 12 and 13 and the back contact means 25 and 25' is ensured. To make a stable electrical connection of the back contact means 25 and 25' with the contact means 12 and 13, the common contact surfaces of the contact means 12, 13 with the back contact means 25, 25' are heated to the melting point of the solder through the solar module by means of an induction soldering process.

FIG. 9 shows the plug connector 28, which is formed from an injection-molded housing 31 with a kink protection 7' and in which the lines 5 and 6 end as contacts 32 and 32'. FIG. 10 shows the internal components of the plug connector 28, in which the lines 5 and 6 are connected to the contacts 32 and 32' via the circuit board 33. The contacts 32 and 32' represent the two electric poles required to produce a current flow between the solar module 22 and the further electrical components of a solar roof system. Within the contacting of the line 5 on the circuit board 33, the reverse current diode 34 is arranged as a non-return valve for the line 5. This prevents the flow of a reverse current into the solar module 22 connected to the line 5. The capacitor 35 is arranged on the circuit board 33 between the contacts of the lines 5 and 6. This enables its detection by means of an alternating current signal applied to contacts 32 and 32'. The connection of a solar module 22 successfully connected via the lines 5 and 6 within a solar roof system can easily be counted or detected by means of the capacitor 35. In the present embodiment, a suitable capacitor can be designed with a capacitance of 0.1 to 100 nF.

FIG. 11 shows this as a multiple plug connection means which is designed as a double plug connection means 36, which is formed from an injection molded housing 31' with anti-kink guards 7''' and 7''' and connected to the plug connectors 28 and 28'. The double plug connection means 36 is used to connect the plug connectors 28 and 28' to the main lines 5'' and 6'' of the main cable 2''. The injection molded housing 31' of the double plug connection means 36 comprises a mounting bracket 37 with which it can be connected to the roof structure during roof mounting. For this purpose, the mounting bracket 37 can be screwed, nailed or fastened to components of the roof structure—for example the roof battens—or by means of clamps. FIG. 12 shows the internal components of the double plug connection means 36 and the plug connectors 28 and 28'. Here, the line 5 of the plug connector 28 is connected to the main line 5'' via the circuit board 33, the contact 32 and the penetration contact designed as an insulation displacement contact 38. The main line 5'' represents the positive contact of the electrical system. The line 6 is connected to the series connection contact 39 via the circuit board 33, the contact 32' and can be connected via this series connection contact 39 and the contact 32'' and the circuit board 33' of the plug connector 28' to the line 5' of the plug connector 28'. The line 6' of the plug connector 28' can be connected to the main line 6'' via the circuit board 33', the contact 32''' and the insulation displacement contact 38'. The main line 6'' represents the negative contact of the electrical system. Two solar roof covering elements connected to the main lines 5'' and 6'' via the plug connectors 28 and 28' are connected in series with one another via the double plug connection means 36 therefore as a common group—here as a pair. By providing multiple series connection contacts the double plug connection means 36 can be configured simply as a multiple plug connection means via which more roof covering elements can be connected in series with one another in groups. Several pairs or groups of solar roof covering elements, which are connected with the main lines 5'' and 6'' via additional double or multiple plug connection means are connected in parallel with one another via the main lines 5'' and 6''.

FIG. 13 shows an assembly of two solar roof covering elements 26 and 26' in a hanging mounting on a roof batten 40. The solar roof covering elements 26 and 26' are connected to the main cable 2'' via the double plug connection means 36 and are connected in series with one another as a pair. The plug-in sockets 1 and 1' are arranged in such a way that any moisture formed by condensation can drip off the cables 2 and 2' without penetrating into the plug-in sockets 1 and 1'. Another pair of solar roof covering elements which can be connected to the main lines 5'' and 6'' via the further double plug connection means 36', can be connected in parallel with the pair of solar roof covering elements 26/26' via the double plug connection means 36'.

FIG. 14 shows a schematic circuit of an assembly of several solar roof covering elements as a solar roof system. The individual solar roof covering elements are each connected in pairs via series connection contacts to the main lines 5'' and 6'' and are each connected in series with one another. In the circuit diagram according to FIG. 14, the solar roof covering elements 26 and 26' and the series connection contact 39 are numbered by way of example. The individual pairs of solar roof covering elements connected in series with each other are connected in parallel with each other via the series connection contacts and the main lines 5'' and 6''. The assembly is designed for a total voltage of a maximum of 120 V. The main lines 5'' and 6'' are connected to the converter 41, which, depending on the desired functionality and design of the solar roof system, can be, for example, an inverter, an MPP tracker or a charge controller.

FIG. 15 shows a perspective, partially transparent view of the plug-in socket 1''' into which the two-core cable 2''' ends. In the cable 2''', the two electric lines 5''' and 6''', each designed as copper wires with wire insulation 3' and 4', are guided within a common cable sheath. The plug-in socket 1''' is formed with the kink protection 7, the round plug-in flange 8' and the conical plug-in section 9'. In the region of the lateral surface of the plug-in section 9', the plug-in socket 1''' is formed with the lamellar outer connecting-link 10'. On its upper face, the plug-in socket 1''' forms the flat connection socket 11', in which the lines 5''' and 6''' end on the top surface of the plug-in section 9' as contact means 12' and 13'. The contact means 12' and 13' represent the two electric poles required to produce a current flow to a solar module and are designed with a solder coating. The plug-in socket 1''' is also designed with two internal insertion channels 44 and 44', which are each accessible via access openings 42, 42' on the lower face of the plug-in socket 1'''. The insertion channels 44 and 44' each end at their upper ends at an effective distance from the contact means 12' and 13'. The effective distance is selected in such a way that a finger-shaped induction soldering tool 43 inserted in an interlocking manner into the insertion channels 44 and 44' ensures sufficient energy input to the contact means 12' and 13' to melt their solder coating or, in addition, the solder coating on the back contact means arranged on the contact means 12' and 13'. The induction soldering tool 43 can be successively inserted into the insertion channels 44 and 44' to produce a solder connection. Alternatively, two induction soldering tools can also be inserted into the insertion channels 44 and 44' in parallel at the same time. Instead of having two separate insertion channels 44 and 44', the plug-in socket 1" can also be configured with a common insertion channel for both contact means 12' and 13'. The contact means 12' and 13' are then heated simultaneously by a single, appropriately dimensioned induction soldering tool.

LIST OF REFERENCE SYMBOLS 1, 1', 1" plug-in socket
2, 2', 2'" cable
2" main cable
3, 3', 4, 4' cable insulation
5, 5', 5'", 6, 6', 6'" line
5", 6" main line
7, 7', 7", 7'", 7"", 7""' kink protection
8, 8' plug-in flange
9, 9' plug-in section
10, 10' outer connecting-link
11, 11' connection socket
12, 12', 13, 13' contact means
14, 20 seal
15 double clamp
16 outer sleeve
17 slots
18 inner connecting-link
19 retaining flange
21, 21' protective film
22 solar module
23 cell matrix
24 pane of glass
25, 25' back contact means
26, 26' solar roof covering element
27 main part
28, 28' plug connectors
29 receiving surface
30 opening
31, 31' injection molded housing
32, 32', 32', 32'" contact
33, 33' circuit board
34 reverse current diode
35 capacitor
36 double plug connection means
37 mounting bracket
38, 38' insulation displacement contact
39 series connection contact
40 roof batten
41 converter
42, 42' access opening
43 induction soldering tool
44, 44' insertion channel

The invention claimed is:

1. A roof covering element comprising:
a flat main part including (i) an upper face defining a receiving surface for a solar module, (ii) an opposite lower face, and (iii) an opening extending through the main part from the upper face to the lower face;
a common plug-in socket including:
a connection socket received in the opening, the connection socket defining (i) a flat upper surface positioned within an area of the receiving surface of the main part, and (ii) a first connecting-link defined on an outer surface of the connection socket; and
a plug-in flange extending from a lower side of the connection socket and positioned adjacent the lower face of the main part, the plug-in flange configured to prevent movement of the plug-in socket in a first axial plug-in direction toward the upper face of the main part;
at least two electric lines guided through the opening from the plug-in flange to the connection socket, the at least two electric lines forming contacts in the flat upper surface, wherein the contacts are either held or guided in an axially movable manner within the connection socket; and
a locking element adjacent the upper face of the main part, the locking element including (i) a second connecting-link configured to engage the first connecting-link of the connection socket in an interlocking and/or force-fitting manner, and (ii) a retaining flange positioned adjacent the upper face of the main part and configured to prevent movement of the plug-in socket in an opposite second axial direction toward the lower face of the main part.

2. The roof covering element according to claim 1, wherein a sealing element is arranged between the plug-in flange and the lower face of the main part.

3. The roof covering element according to claim 1, wherein the second connecting-link is a clamp or a snap ring.

4. The roof covering element according to claim 1, wherein:
the second connecting-link is a hollow element configured to receive at least a portion of the connection socket, and
the retaining flange is configured to act on the upper face of the main part against movement in the second axial plug-in direction.

5. The roof covering element according to claim 4, wherein the second connecting-link is an outer sleeve which engages with a screw connection or a plug-in rotary connection on a corresponding screw or plug-in section of the first connecting-link of the connection socket.

6. The roof covering element according to claim 4, wherein the second connecting-link is an outer sleeve which is slotted in the second axial plug-in direction and which engages in a latching manner on a corresponding plug-in section of the first connecting-link of the connection socket.

7. The roof covering element according to claim 4, wherein a sealing element is arranged on an upper face of the retaining flange.

8. The roof covering element according to claim 1, wherein:
the contacts protrude from the upper surface of the connection socket, and
the contacts are biased in a spring-loaded manner in the first axial plug-in direction.

9. The roof covering element according to claim 1, wherein the contacts are held in the connection socket with an axial deformation clearance.

10. The roof covering element according to claim 9, wherein the contacts are formed from a solder material or are configured with a solder coating.

11. The roof covering element according to claim 1, wherein:
the common plug-in socket further includes at least one insertion channel defined in the connection socket and configured to receive a soldering tool,
the at least one insertion channel includes an access opening on a lower face of the plug-in socket, and the soldering tool is positionable in contact with the contacts via the access opening and the at least one insertion channel.

12. The roof covering element according to claim 11, wherein the at least one insertion channel ends at an effective distance from the contacts and an induction soldering tool can be inserted into the at least one insertion channel through the access opening.

13. The roof covering element according to claim 1, wherein the at least two electric lines are operably connected to a multi-pole plug connector.

14. The roof covering element according to claim 13, wherein a capacitor is connected between the at least two electric lines.

15. The roof covering element according to claim 14, wherein a reverse current diode is arranged in at least one of the at least two electric lines.

16. The roof covering element according to claim 15, wherein the capacitor and/or the reverse current diode is or are arranged within the plug connector.

17. A solar roof covering element comprising:
a roof covering element including:
a flat main part including (i) an upper face defining a receiving surface, (ii) an opposite lower face, and (iii) an opening extending through the main part from the upper face to the lower face;
a common plug-in socket including:
a connection socket received in the opening, the connection socket defining (i) a flat upper surface positioned within an area of the receiving surface of the main part, and (ii) a first connecting-link defined on an outer surface of the connection socket; and
a plug-in flange extending from a lower side of the connection socket and positioned adjacent the lower face of the main part, the plug-in flange configured to prevent movement of the plug-in socket in a first axial plug-in direction toward the upper face of the main part;
at least two electric lines guided through the opening from the plug-in flange to the connection socket, the at least two electric lines forming contacts in the flat upper surface, wherein the contacts are either held or guided in an axially movable manner within the connection socket; and
a locking element adjacent the upper face of the main part, the locking element including (i) a second connecting-link configured to engage the first connecting-link of the connection socket in an interlocking and/or force-fitting manner, and (ii) a retaining flange positioned adjacent the upper face of the main part and configured to prevent movement of the plug-in socket in an opposite second axial direction toward the lower face of the main part; and
a solar module positioned on the receiving surface of the main part, the solar module including back contacts configured to engage directly the contacts in the upper surface of the connection socket to electrically connect the solar module to the plug-in socket.

18. The solar roof covering element according to claim 17, wherein:
the contacts in the connection socket are held with an axial deformation clearance, and
the back contacts of the solar module are formed from a solder material or with a solder coating.

19. The solar roof covering element according to claim 17, wherein the solar module has a cell matrix made up of several solar cells connected in series.

20. The solar roof covering element according to claim 19, wherein a format, a number, and an assembly of the solar cells are selected such that the receiving surface of the main part is covered.

21. The solar roof covering element according to claim 17, wherein the upper face of the main part is a glass pane or a plastic pane or film that forms a roof skin.

22. An assembly of solar roof covering elements comprising:
a plurality of roof covering elements, each of the roof covering elements including:
a flat main part including (i) an upper face defining a receiving surface, (ii) an opposite lower face, and (iii) an opening extending through the main part from the upper face to the lower face;
a common plug-in socket including:
a connection socket received in the opening, the connection socket defining (i) a flat upper surface positioned within an area of the receiving surface of the main part, and (ii) a first connecting-link defined on an outer surface of the connection socket; and
a plug-in flange extending from a lower side of the connection socket and positioned adjacent the lower face of the main part, the plug-in flange configured to prevent movement of the plug-in socket in a first axial plug-in direction toward the upper face of the main part;
at least two electric lines guided through the opening from the plug-in flange to the connection socket, the at least two electric lines forming contacts in the flat upper surface, wherein the contacts are either held or guided in an axially movable manner within the connection socket; and
a locking element adjacent the upper face of the main part, the locking element including (i) a second connecting-link configured to engage the first connecting-link of the connection socket in an interlocking and/or force-fitting manner, and (ii) a retaining flange positioned adjacent the upper face of the main part and configured to prevent movement of the plug-in socket in an opposite second axial direction toward the lower face of the main part; and
a plurality of solar modules, each of the solar modules configured to be arranged on the receiving surface of a respective one of the roof covering elements and including back contacts configured to engage directly the contacts in the upper surface of the corresponding connection socket to electrically connect the solar module to the plug-in socket,
wherein the solar modules are connected in a parallel connection.

23. An assembly of solar roof covering elements comprising:
a plurality of roof covering elements, each of the roof covering elements including:
a flat main part including (i) an upper face defining a receiving surface, (ii) an opposite lower face, and (iii) an opening extending through the main part from the upper face to the lower face;
a common plug-in socket including:
a connection socket received in the opening, the connection socket defining (i) a flat upper surface positioned adjacent the receiving surface of the main part, and (ii) a first connecting-link defined on an outer surface of the connection socket; and
a plug-in flange extending from a lower side of the connection socket and positioned adjacent the lower face of the main part, the plug-in flange configured to prevent movement of the plug-in socket in a first axial plug-in direction toward the upper face of the main part;
at least two electric lines guided through the opening from the plug-in flange to the connection socket, the at least two electric lines forming contacts in the flat upper surface, wherein the contacts are axially movable within the connection socket relative to the flat upper surface; and
a locking element adjacent the upper face of the main part, the locking element including (i) a second connecting-link configured to engage the first connecting-link of the connection socket in an interlocking and/or force-fitting manner, and (ii) a retaining flange positioned adjacent the upper face of the main part and configured to prevent movement of the plug-in socket in an opposite second axial direction toward the lower face of the main part; and
a plurality of solar modules, each of the solar modules configured to be arranged on the receiving surface of a respective one of the roof covering elements and including back contacts configured to engage directly the contacts in the upper surface of the corresponding connection socket to electrically connect the solar module to the plug-in socket,
wherein the solar roof covering elements are connected to form groups, each of the groups including at least two of the solar modules,
wherein the at least two solar modules are connected in series, and
wherein the groups of solar roof covering elements are connected to each other in a parallel connection.

24. The assembly of solar roof covering elements according to claim 23, wherein the at least two solar modules are configured for a total voltage of a maximum of 80 V to 120 V.

25. The assembly of solar roof covering elements according to claim 23, wherein:
the at least two electric lines are operably connected to a multi-pole plug connector,
the solar roof covering elements are configured to be connected to each other in series via the respective multi-pole plug connectors in groups via a common multiple plug connection structure,
a series connection between the solar roof covering elements is established by a line routing inside the multiple plug connection structure, and
the groups of the solar roof covering elements are configured to be connected in parallel with each other via main lines in the multiple plug connection structure.

26. The assembly of solar roof covering elements according to claim 25, wherein in the multiple plug connection structure each engage with two penetration contacts on two different electric poles of the main lines.

27. A method for producing a solar roof covering element, the method comprising:
arranging a solar module on a receiving surface of a roof cover element, the roof covering element including:
a flat main part including (i) an upper face defining the receiving surface, (ii) an opposite lower face, and (iii) an opening extending through the main part from the upper face to the lower face;
a common plug-in socket including:
a connection socket received in the opening, the connection socket defining (i) a flat upper surface positioned within an area of the receiving surface of the main part, and (ii) a first connecting-link defined on an outer surface of the connection socket; and
a plug-in flange extending from a lower side of the connection socket and positioned adjacent the lower face of the main part, the plug-in flange configured to prevent movement of the plug-in socket in a first axial plug-in direction toward the upper face of the main part;
at least two electric lines guided through the opening from the plug-in flange to the connection socket, the at least two electric lines forming contacts in the flat upper surface, wherein the contacts are either held or guided in an axially movable manner within the connection socket; and
a locking element adjacent the upper face of the main part, the locking element including (i) a second connecting-link configured to engage the first connecting-link of the connection socket in an interlocking and/or force-fitting manner, and (ii) a retaining flange positioned adjacent the upper face of the main part and configured to prevent movement of the plug-in socket in an opposite second axial direction toward the lower face of the main part,
wherein the solar module includes back contacts which are arranged corresponding to the contacts in the upper surface of the connection socket, and
wherein the contacts protrude from the upper surface of the connection socket and are guided against the second axial plug-in direction in a spring-loaded manner;
establishing a force-fitting connection between the contacts and the back contacts against the spring loading of the contacts.

28. A method for producing a solar roof covering element, the method comprising:
arranging a solar module on a receiving surface of a roof cover element, the roof covering element including:
a flat main part including (i) an upper face defining the receiving surface, (ii) an opposite lower face, and (iii) an opening extending through the main part from the upper face to the lower face;
a common plug-in socket including:
a connection socket received in the opening, the connection socket defining (i) a flat upper surface positioned within an area of the receiving surface of the main part, and (ii) a first connecting-link defined on an outer surface of the connection socket; and
a plug-in flange extending from a lower side of the connection socket and positioned adjacent the lower face of the main part, the plug-in flange configured to prevent movement of the plug-in socket in a first axial plug-in direction toward the upper face of the main part;
at least two electric lines guided through the opening from the plug-in flange to the connection socket, the at least two electric lines forming contacts in the flat upper surface, wherein the contacts are either held or guided in an axially movable manner within the connection socket; and
a locking element adjacent the upper face of the main part, the locking element including (i) a second connecting-link configured to engage the first connecting-link of the connection socket in an interlocking and/or force-fitting manner, and (ii) a retaining flange positioned adjacent the upper face of the main part and configured to prevent movement of the plug-in socket in an opposite second axial direction toward the lower face of the main part, wherein the contacts in the connection socket are fixed or held with an axial deformation clearance, wherein the contacts and/or back contacts are formed from a solder material or with a solder coating, and wherein the solar module is arranged on the receiving surface and common contact surfaces of the contacts and back contacts are heated up to a melting point of the solder by an energy input through the solar module.

29. The method according to claim 28, wherein the energy input takes place by induction soldering.

30. The method for producing a solar roof covering element according to claim 28, wherein the contacts are held in the connection socket firmly or with an axial deformation clearance, wherein the contacts and/or the back contacts are formed from a solder material or are formed with a solder coating, wherein the plug-in socket is formed with an insertion channel or two insertion channels for a soldering tool, which is or which are accessible via an access opening on the lower face of the plug-in socket and via which a contact to the contacts is established, and wherein the solar module is arranged on the receiving surface and common contact surfaces of the contacts and the back contacts are heated up to a melting point of the solder by a soldering tool inserted into the insertion channel or successively inserted into the insertion channels or two soldering tools inserted simultaneously in parallel into the insertion channels.

31. The method according to claim 30, wherein the insertion channel or channels ends or end at its or their upper end at an effective distance from the contacts.

* * * * *